United States Patent
Urano et al.

(10) Patent No.: US 8,260,811 B2
(45) Date of Patent: Sep. 4, 2012

(54) ACCESS CONTROLLER THAT CONTROLS ACCESS TO FILES BY USING ACCESS CONTROL LIST

(75) Inventors: Akihiro Urano, Machida (JP); Takaki Nakamura, Ebina (JP); Hitoshi Kamei, Sagamihara (JP); Masakuni Agetsuma, Yokohama (JP); Yasuo Yamasaki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 331 days.

(21) Appl. No.: 12/020,760

(22) Filed: Jan. 28, 2008

(65) Prior Publication Data

US 2009/0077087 A1 Mar. 19, 2009

(30) Foreign Application Priority Data

Sep. 18, 2007 (JP) .................................. 2007-241563

(51) Int. Cl.
*G06F 17/30* (2006.01)
*G06F 7/00* (2006.01)
(52) U.S. Cl. .................. 707/781; 707/610; 707/690
(58) Field of Classification Search ............... None
See application file for complete search history.

(56) References Cited

U.S. PATENT DOCUMENTS

| | | | |
|---|---|---|---|
| 5,548,740 A * | 8/1996 | Kiyohara | 345/543 |
| 7,031,092 B2 * | 4/2006 | Tanaka et al. | 360/75 |
| 7,240,220 B2 * | 7/2007 | Osaki | 713/193 |
| 2002/0019936 A1 * | 2/2002 | Hitz et al. | 713/165 |
| 2003/0115344 A1 * | 6/2003 | Tang et al. | 709/229 |
| 2004/0153765 A1 * | 8/2004 | Prifling | 714/18 |
| 2005/0086491 A1 * | 4/2005 | Haugh et al. | 713/182 |
| 2005/0131902 A1 | 6/2005 | Saika | |
| 2008/0082589 A1 * | 4/2008 | English et al. | 707/203 |

FOREIGN PATENT DOCUMENTS

JP 2005-78612 3/2005

* cited by examiner

*Primary Examiner* — Hosain Alam
*Assistant Examiner* — Sangwoo Ahn
(74) *Attorney, Agent, or Firm* — Brundidge & Stanger, P.C.

(57) ABSTRACT

Each time the file access request is received, it is discriminated whether there is an ACL which corresponds with the file system of the type following the switching in the file designated by the file access request. In cases where the judgment result is that there is no such ACL, an ACL which corresponds with the file system of the type following the switching is generated on the basis of an ACL which corresponds with the file system of the type prior to the switching which is associated with the designated file, and the ACL thus generated is used to control access in accordance with the received file access request.

17 Claims, 11 Drawing Sheets

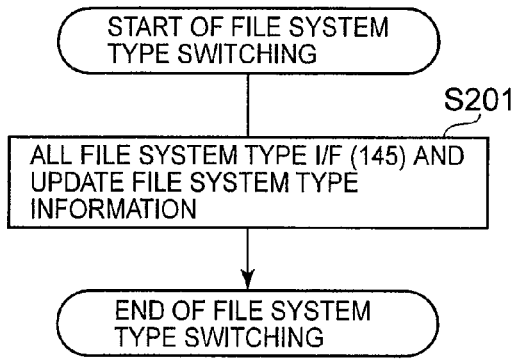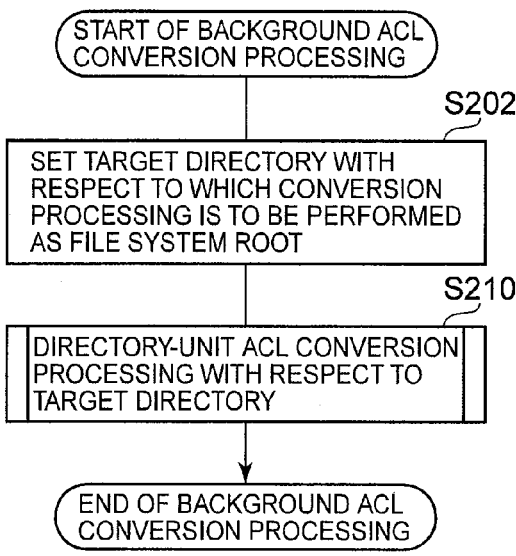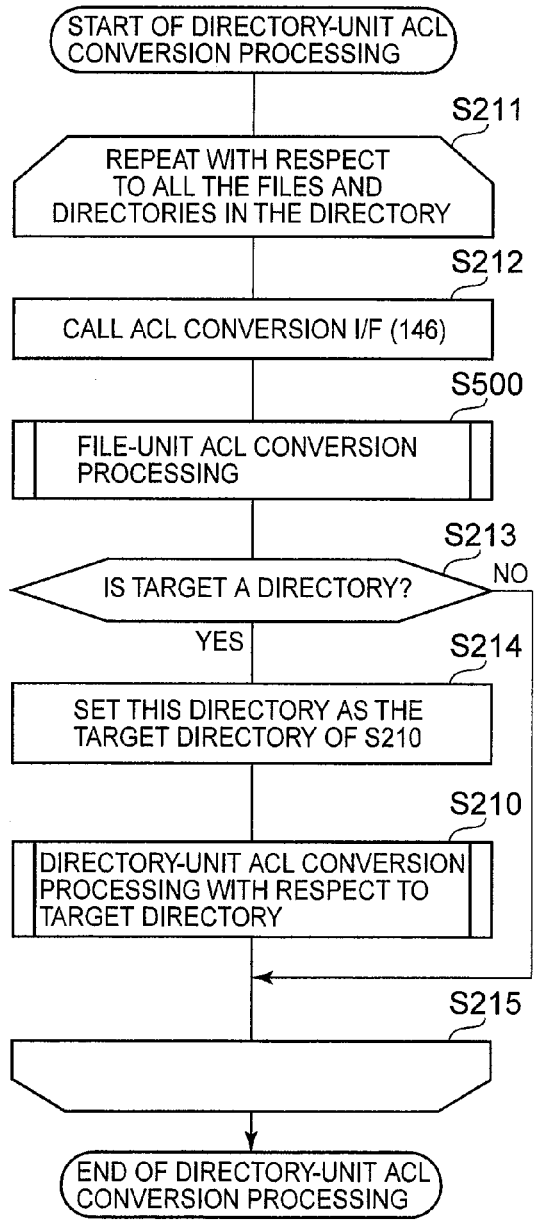

FIG. 11A

| name ~811 | value ~812 |
|---|---|
| file ~821 | startfile. exe ~822 |
| owner ~831 | smith ~832 |
| group ~841 | sales_department ~842 |
| system. posix_acl_access<br>851 | user::rwx<br>user:mike:r-x ~852<br>user:bill:---<br>user:linus:rwx<br>group::r--<br>mask::rwx<br>other::r-- |
| system. ntfs_acl<br>861 | localhost¥bill:(DENY) FILE_GENERIC_READ \| FILE_GENERIC_EXECUTE<br>localhost¥smith:FILE_GENERIC_ALL<br>localhost¥mike:FILE_GENERIC_READ \| FILE_GENERIC_EXECUTE<br>localhost¥linus:FILE_GENERIC_ALL<br>localhost¥sales_department:FILE_GENERIC_READ<br>Everyone:FILE_GENERIC_READ     862 |

| FILE SYSTEM TYPE | FILE SYSTEM USING POSIX ACL |
|---|---|

FIG. 11C

| FILE SYSTEM TYPE | FILE SYSTEM USING NTFS ACL |
|---|---|

//www.w3.org/1999/xhtml">
ACCESS CONTROLLER THAT CONTROLS ACCESS TO FILES BY USING ACCESS CONTROL LIST

CROSS-REFERENCE TO PRIOR APPLICATION

This application relates to and claims the benefit of priority from Japanese Patent Application number 2007-241563, filed on Sep. 18, 2007 the entire disclosure of which is incorporated herein by reference.

BACKGROUND

The present invention generally relates to a technology for controlling access to files by using a file control list.

Generally, a file server (for example, NAS (Network Attached Storage)) is used in order to share files between a plurality of clients (users). Access to the shared files is controlled using an access control list ('ACL' hereinbelow). The ACL describes which users are able to access files in which operations, for example.

Representative examples of ACL include POSIX ACL, which is used by UNIX (registered trademark), and NTFS ACL, which is employed by Windows (registered trademark). The POSIX is an abbreviation for Portable Operating System Interface and NTFS is an abbreviation for NT FileSystem. Although there are a lot of file servers compatible with only POSIX ACL, there are also file servers that are compatible with NTFS ACL.

POSIX ACL and NTFS ACL are not directly interchangeable. As a result, in order to perform access control using NTFS ACL, it is necessary to switch the file system from a file system of a type which corresponds with POSIX ACL to a file system of a type that corresponds with NTFS ACL. More specifically, for example, it is necessary to temporarily stop services (stop accepting file access requests from the client, for example) and, while services are stopped, generate and associate, for each file, NTFS ACL which correspond with the file system following the switch using the procedure disclosed by Japanese Application Laid Open No. 2005-78612, for example.

In general, the number of files stored in a storage device is huge. For this reason, when the generation of ACL which corresponds with the file system of the type following the switch is performed for all files, the length of time services are stopped increases. The length of service stoppage time is desirably as short as possible and ideally zero.

SUMMARY

Therefore, an object of the present invention is to be able to perform access control using an ACL that corresponds with a file system of the type following the switch without stopping services.

Further objects of the present invention will become evident from the following description.

An ACL which corresponds with a file system of the type following the switching is not generated for all the files when the type of the file system is switched. Rather, each time the file access request is received, it is discriminated whether there is an ACL which corresponds with the file system of the type following the switching in the file designated by the file access request. In cases where the judgment result is that there is no such ACL, an ACL which corresponds with the file system of the type following the switching is generated on the basis of an ACL which corresponds with the file system of the type prior to the switching which is associated with the designated file and the ACL thus generated is used to control access in accordance with the received file access request.

BRIEF DESCRIPTION OF THE DRAWINGS

FIG. 2A is a flowchart for switching the file system type;

FIG. 2B shows a flowchart for background ACL conversion processing;

FIG. 2C shows a flowchart for ACL conversion processing in directory units;

FIG. 11A shows an example of a file part that is constituted by file metadata, a POSIX ACL and an NTFS ACL;

FIG. 11B shows file system type information that represents a file system that corresponds with POSIX ACL;

FIG. 11C shows file system type information that represents a file system that corresponds with NTFS ACL;

DESCRIPTION OF THE PREFERRED EMBODIMENTS

Figure 1:
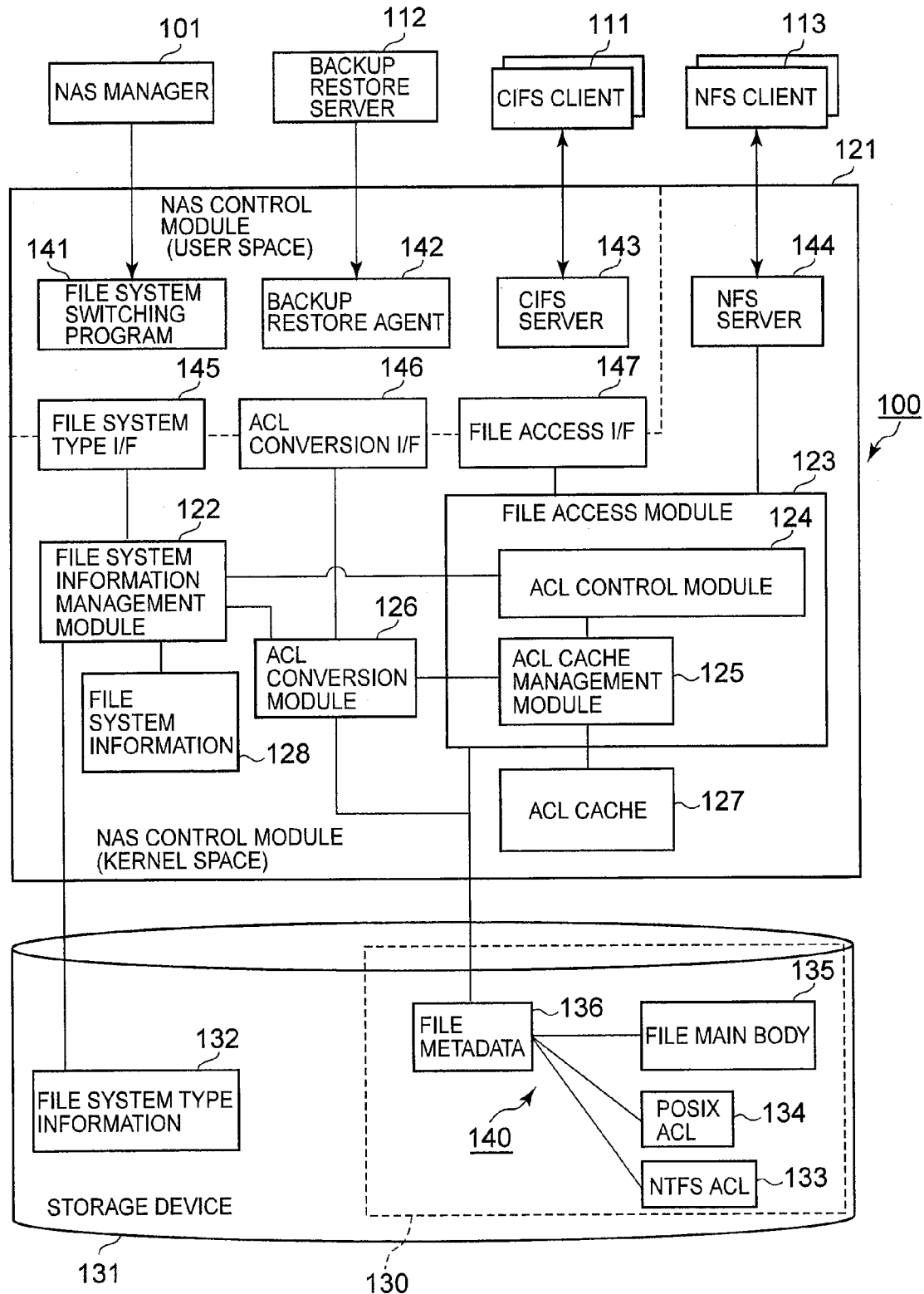
FIG. 1 shows a constitutional example of the whole system according to a first embodiment of the present invention.

According to Embodiment 1, an access controller that receives a file access request and uses an ACL to access the file designated by the file access request comprises an ACL judgment module, an ACL generation module, and an access control module. The ACL judgment module judges whether a first type of ACL which corresponds with a first type of file system is associated with a file designated by the file access request in response to receiving the file access request. The ACL generation module generates the first type of ACL on the basis of a second type of ACL which corresponds with the second type of file system which is already associated with the designated file when the result of the judgment is negative. The access control module controls access to the designated file by using the first type of ACL thus generated. According to the first embodiment, each time a file access request is received, if there is no first type of ACL in the designated file, a first type of ACL is generated based on the existing second type of ACL and access control is performed using the first type of ACL thus generated. Hence, even when the type of file system is switched from the second type to the first type, services are not stopped and access control using the first type of ACL can be performed.

In Embodiment 2, the access controller according to Embodiment 1 further comprises a switching instruction reception module that receives a switching instruction to switch the type of the file system or the type of the ACL to be used from the second type to the first type; and a switching module that switches the type of the file system or the type of the ACL from the second type to the first type in response to the switching instruction. The ACL generation module generates the first type of ACL on the basis of the second type of ACL which corresponds with the file designated by the file access request in cases where the result of the judgment performed in response to receiving the file access request is negative after the type of the file system or the type of the ACL to be used is switched from the second type to the first type.

In Embodiment 3, the access controller according to the Embodiment 2 further comprises a storage resource that stores type information indicating the type of the file system or the type of the ACL to be used. The ACL judgment module is constituted to specify the type of the current file system or ACL by referencing the type information. The switching module completes the switching of the type of the file system or the type of the ACL to be used from the second type to the first type by updating the type information from information indicating the second type to information indicating the first type.

In Embodiment 4, the access controller according to any one of Embodiments 1 to 3 further comprises a memory (may be a volatile or involatile memory). The ACL generation module judges whether the first type of ACL thus generated can be written to a logical storage space which comprises files managed by the file system or not and, if judged that writing is possible, the ACL generation module writes the first type of ACL corresponding with the file to both the logical storage space and the memory and, if judged that writing is impossible, the ACL generation module does not write the first type of ACL corresponding with the file to the logical storage space and writes the first type of ACL to the memory. The ACL judgment module performs a judgment of whether the first type of ACL designated by the received file access request is associated by referencing the memory and, in cases where the first type of ACL which corresponds with the file is stored in the memory, the result of the judgment is affirmative. According to Embodiment 4, irrespective of whether a file access request that indicates reading is received from a client, for example, even when an error whereby the first type of ACL is not written to the logical storage space due to the capacity of the logical storage space being exhausted or similar arises, the file system is able to report an error in writing the first type of ACL to the memory to the client.

In Embodiment 5, the access controller according to Embodiment 4 is such that, in any of the following cases (1) to (3), the ACL generation module judges that the generated first type of ACL cannot be written to the logical storage space:

(1) a case where a spare capacity of a magnitude permitting storage of the generated first type of ACL does not exist in the logical storage space;
(2) a case where the difference between the used capacity or spare capacity of the logical storage space and a preset control value is a predetermined value; and
(3) a case where an access attribute signifying that reading is possible but writing is impossible is associated with the logical storage space.

In Embodiment 6, the access controller according to Embodiment 4 or 5 further comprises an ACL destage module. The ACL destage module monitors whether the first type of ACL can be written to the logical storage space and, when detected that writing is possible, writes the first type of ACL that has not yet been written to the logical storage device and which is stored in the memory to the logical storage space. According to Embodiment 6, a situation where the first type of ACL will not be written to the logical storage space indefinitely can be prevented.

In Embodiment 7, the access controller according to any one of Embodiments 1 to 3 is such that, even when an access attribute signifying that reading is possible but writing is impossible is associated with the logical storage space that comprises files managed by the file system, the ACL generation module writes the first type of ACL which is associated with the designated file to the logical storage space. According to Embodiment 7, the first type of ACL is written to the logical storage space even in a situation where writing by the client is logically prohibited because the file system has been mounted as a read only file system. Hence, the burden of having to generate the first type of ACL each time a file access request designating the same file is received can be suppressed.

In Embodiment 8, the access controller according to any one of Embodiments 1 to 7 is such that the ACL judgment module judges whether the first type of ACL is associated with all the files that exist in the logical storage space while accepting the file access request. The ACL generation module generates, each time a negative judgment result is obtained, the first type of ACL which corresponds with the file which corresponds with the negative judgment result on the basis of the second type of ACL which corresponds with the file. According to Embodiment 8, a situation where a file exists that will not be accessed indefinitely but for which the first type of ACL will therefore not be prepared can be prevented from occurring.

In Embodiment 9, the access controller according to any one of Embodiments 1 to 8 further comprises a capacity inquiry reception module that receives an inquiry regarding the used capacity or spare capacity of the logical storage space managed by the file system; and a capacity response module that sends back the used capacity or spare capacity in cases where assumption is made that the first type of ACL is associated with all of the files in the logical storage space. According to Embodiment 9, because the used capacity or spare capacity is sent back in cases where it is assumed that the first type of ACL exists, a situation where the file system is full as a result of the writing of the first type of ACL and where the desired file is not written can be prevented.

In Embodiment 10, the access controller according to any one of Embodiments 1 to 9 is such that, in cases where the second type of ACL corresponding with the file with which the first type of ACL is associated is updated, the ACL generation module updates the first type of ACL on the basis of the updated second type of ACL. According to Embodiment 10, the integrity of the second type of ACL and first type of ACL can be assured.

In Embodiment 11, the access controller according to any one of Embodiments 1 to 10 is such that, in cases where a file with which the first type of ACL is associated is updated to a restored file as a result of a backed up file and the corresponding second type of ACL being restored, the ACL generation module associates a first type of ACL, which is generated on the basis of the restored second type of ACL and corresponds with the updated file, with the updated file constituting the restored file rather than the first type of ACL which corresponds with the pre-update file. According to Embodiment 11, an image that is backed up prior to the switching of the file system type can be restored as an image which corresponds with the file system following the switching of the file system type and the generated first type of ACL can be made the first type of ACL which corresponds with the second type of ACL at the time of the backup.

In Embodiment 12, the access controller according to any one of Embodiments 1 to 11 is such that the ACL generation module writes the generated first type of ACL to the memory and writes, in cases where the first type of ACL stored in the memory is used by the access control module a prescribed number of times or more, the first type of ACL stored in the memory to the logical storage space which comprises files managed by the file system. According to Embodiment 12, because the number of times the first type of ACL is written can be suppressed, the storage device based on the logical storage space is considered useful in cases that are characterized by restrictions on the number of possible writes, a slower write speed than read speed, and/or a higher cost of writing than cost of reading.

Two or more of the above mentioned Embodiments 1 to 12 can be combined. Further, one or more of above the modules (the ACL judgment module, ACL conversion module, access control module, instruction reception module, switching module, ACL destage module, capacity inquiry reception module, and capacity response module) can be constructed by hardware, a computer program, or a combination of hardware and computer programs (for example, some are implemented by a computer program while the remainder are implemented by hardware). The computer programs are read to a predetermined processor where same are executed. Further, at the time of information processing in which a computer program is read to the processor and executed, a storage area that exists in a hardware resource such as the memory may also suitably be used. Furthermore, the computer programs may be installed on a computer from a recording medium such as a CD-ROM or may be downloaded to a computer via a communication network.

Embodiments of the present invention will be described hereinbelow with reference to the drawings.

First Embodiment

FIG. 1 shows a constitutional example of the whole system according to the first embodiment of the present invention.

The NAS system (100) is constituted by a NAS control module (121) (a so-called 'NAS head', for example) and one or a plurality of storage devices (131). The storage devices (131) may, for example, be one or a plurality of storage media drives or a storage subsystem that comprises a plurality of storage media drives.

The NAS control module (121) is able to communicate with a CIFS (Common Internet File System) client (111) that issues CIFS-based file access requests and an NFS (Network File System) client (113) that issues NFS-based file access requests. The NAS control module (121) receives a file access request from client (111) or (113) and provides client (111) or (113) with services for accessing the file designated by the file access request which is stored in a region corresponding with a logical storage space (130) of the storage device (131). FIG. 1 shows CIFS and NFS as examples of file services but file services are not limited to CIFS and NFS. Other file services such as FTP (File Transfer Protocol) and HTTP (HyperText Transfer Protocol) and so forth may also be adopted.

The NAS control module (121) is also able to communicate with a backup and restore server (112) which is a server for backing up and restoring files that are managed by a NAS manager (101) which is a computer that the manager uses in order to perform operations management or a NAS system (100).

The NAS control module (121) is logically divided into a user space and a kernel space. Information is exchanged between the respective spaces via a user kernel interface ('interface' is abbreviated to 'I/F' hereinbelow). In this embodiment, user kernel I/Fs include a file system type I/F (145), an ACL conversion I/F (146), and a file access I/F (147). These I/F (145), (146), and (147) are computer programs that are stored in memory (not shown), for example, and exhibit functions as a result of being executed by a microprocessor (not shown) that the NAS control module (121) comprises.

In the user space, a file system switching program (141) for switching the type of file system, a backup and restore agent (142) for performing a backup and restore, and a CIFS server (143), which processes file access requests form the CIFS client (111) are executed. However, in the kernel space, a file system information management module (122), which processes information on the file system, a file access module (123), which services file access, an ACL conversion module (126), which performs ACL conversion, and an NFS server (144), which processes file access requests from the NFS client (113) operate. These computer programs (141), (142), (143), (122), (123), (126), and (144) are stored in memory (not shown), for example, and exhibit functions as a result of being executed by the microprocessor (not shown) that the NAS control module (121) comprises. The ACL cache management module (125) manages an ACL cache (127) and the file system information management module (122) manages file system information (128). The ACL cache (127) is a volatile (or nonvolatile) cache memory or part of this cache memory, for example. The file system information (128) is stored in the memory (not shown) and contains information representing the type of file system, for example.

The storage device (131) stores file system type information (132) that represents the type of file system. In this embodiment, in order to establish an environment in which various access control, from access control using POSIX ACL to access control using NTFS ACL, is performed, the type of file system corresponding with the POSIX ACL is suitably called the 'old-type' and the type of file system corresponding with NTFS ACL is called the 'new type'. The file system type information (132) indicates whether the type of the current file system is the old or new type.

In addition, the storage region corresponding to the logical storage space (130) that is managed by the file system of the storage device (131) stores one or more files (140). The files (140) are constituted by file metadata (136), a file main body (135), a POSIX ACL (134) and/or an NTFS ACL (133), for example. The files (140) shown in FIG. 1 comprise the NTFS ACL (133) generated based on the POSIX ACL (134) rather than the POSIX ACL (134) because a file access request designating the file (140) has sometimes previously been received after the type of the file system has been switched from the old type to the new type. However, all the files (140) are not limited to comprising both the POSIX ACL (134) and the NTFS ACL (133) and sometimes comprise either the POSIX ACL (134) or the NTFS ACL (133).

FIG. 11A shows an example of a file part that is constituted by file metadata, a POSIX ACL and an NTFS ACL.

The reference numeral 801 is the data part. The reference numeral 811 represents the name of an attribute and data fragments that represent the name of the attribute include the reference numerals 821, 831, 841, 851, and 861 respectively. The reference numeral 812 indicates the actual value of the attribute and data fragments representing the value of the attribute include data fragments represented by the reference numerals 822, 832, 842, 852, and 862 respectively. The data fragments constituting the file metadata are data fragments represented by the reference numerals 821, 822, 831, 832, 841 and 842 respectively. The data fragments constituting the POSIX ACL are data fragments represented by the reference numerals 851 and 852 respectively. The data fragments constituting the NTFS ACL are data fragments represented by the reference numerals 861 and 862 respectively.

FIGS. 11B and 11C represent constitutional examples of the file system type information (132).

According to FIG. 11B, the file system type information (132) represents a file system corresponding with the POSIX ACL, that is, the old type of file system. When the type of the file system is switched, the file system type information (132) is updated from the information shown in FIG. 11B to the information shown in FIG. 11C, that is, to information representing the file system corresponding with the NTFS ACL, that is, the new type.

The flow of processing that is performed in this embodiment will be described hereinbelow. In the following description, in cases where the computer program is the subject, in reality, the processing is performed by a microprocessor (a CPU, for example) that executes the computer program.

FIG. 2A is a flowchart for switching the file system type. The "S" in the reference numeral is an abbreviation for "step". The switching of the file system type is performed in cases where the type of a file system with respect to which access control is performed using a POSIX ACL is shifted to the type of a file system that performs access control using NTFS ACL, for example. That is, the switching of the file system type is performed in cases where the type is switched from the old type to the new type of file system (and, conversely, may also be applied to switching from the new type to the old type of file system).

In S201, the file system type switching program (141) receives a switching instruction to switch the file system from the old type to the new type from the NAS manager 101 (or another device) and, in response to the switching instruction, calls the file system type I/F (145) in response to the switching instruction. The file systemtype I/F (145) calls the file system information management module (122). The file system information management module (122) updates the file system type of the designated file system. More specifically, the file system information management module (122) updates the file system type information (132) from the information recorded as the 'file system using POSIX ACL' (that is, the information shown in FIG. 11B) to the information recorded as the 'file system using NTFS ACL' (that is, the information shown in FIG. 11C) In addition, the file system information management module (122) writes file system information (126) comprising the updated file system type information (132) as cache to memory (not shown).

According to this embodiment, the switching of the file system type is completed simply by updating the file system type information (132). Thereafter, as will be described subsequently, NTFS ACL (133) must be associated with the file designated by the file access request whenever a file access request is received (must be included in the file) and the POSIX ACL (134) that are already associated with the file is converted to an NTFS ACL (133) (in other words, an NTFS ACL (133) is generated based on the POSIX ACL (134)) and file access control using the converted NTFS ACL (133) is executed. In this embodiment, the pre-conversion POSIX ACL (134) is associated as is with the file without being destroyed by the conversion (when the conversion is complete, the pre-conversion POSIX ACL (134) may also be deleted by the ACL conversion module (126)).

Thus, in this embodiment, because an NTFS ACL (133) is generated in response to the file access request, when there is a file that has not been designated by a file access request at any time, an NTFS ACL (134) has not been associated with this file at any time.

Therefore, in this embodiment, all the files in the designated logical storage space are scanned in the so-called background in parallel with a state in which the NTFS ACL (133) is generated in response to a file access request (that is, the file access request is accepted as is) and, if there is no NTFS ACL (133) in the file, processing to convert the POSIX ACL (134) that is associated with the file is converted to the NTFS ACL (133).

FIG. 2B shows a flowchart for background ACL conversion processing. FIG. 2C shows a flowchart for ACL conversion processing in directory units.

In cases where an instruction for ACL conversion processing in the background (an instruction designating a directory, for example) is received from the NAS manager (101), the file system switching program (141) sets the designated directory for the file system root as the target directory (S202).

Thereafter, the file system switching program (141) performs ACL conversion processing in directory units on the files belonging to the target directory (S210). In ACL conversion processing, as shown in FIG. 2C, the procedure from S212 to S215 is repeated with respect to all the files and directories in the target directory (S211).

The file system switching program (141) calls the ACL conversion I/F (146) (S212), the ACL conversion I/F (146) calls the ACL conversion module (126), and the ACL conversion module (126) carries out ACL conversion processing in file units (S500). The details of the file-unit ACL conversion processing will be provided subsequently.

Thereafter, the file system switching program (141) judges whether the target is a directory (S213) and, in cases where the target is a directory, executes directory-unit ACL conversion processing recursively. More specifically, the file system switching program (141) sets the directory as the target directory (S214) and recursively calls the processing of S210. In cases where the target was not a directory, the processing returns to S211, whereupon the file-unit ACL conversion processing is executed with respect to the other files.

Once S212 to S215 have been carried out with respect to all the files and directories that exist in the directory established in S202 of FIG. 2B, S210 of FIG. 2B comes to an end.

The flow of processing that is executed in cases where a file access request is received from client (111) or (113) following the switching of the file system type will be described next.

Figure 3:
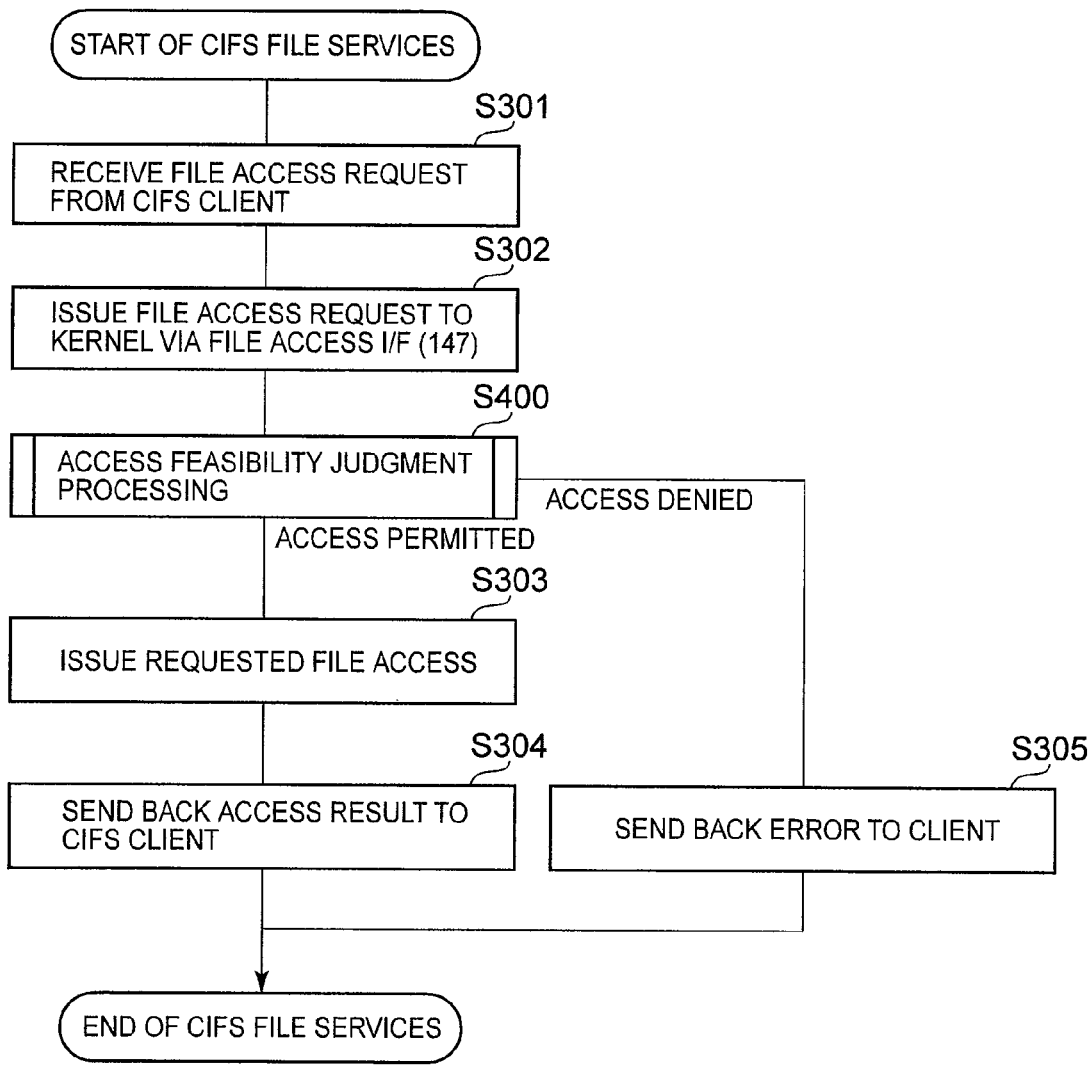
FIG. 3 is a flowchart for CIFS file services.

FIG. 3 is a flowchart for CIFS file services. Substantially the same processing is carried out for NFS and other file services.

First, the CIFS server (143) receives a file access request from the CIFS client (111) (S301).

Thereafter, the CIFS server (143) calls the file access I/F (147) and issues a file access request to the kernel via the I/F (147) (S302).

In response to the file access request, the access control module (124) in the file access module (123) judges whether it is possible to access the file that was designated by the user using the CIFS client (111) that is the source that issued the file access request ('access user' hereinbelow) (S400) The details of the access feasibility judgment processing of S400 will be described subsequently. However, the file-unit ACL conversion processing is also performed in this judgment processing.

In cases where access is permitted in the judgment of S400, the file access module (123) executes access in accordance with the request to the file that was designated by the file access request (writes or reads the file, for example) (S303) and the CIFS server (143) sends the access result back to the CIFS client (111) that was the source of the file access request by way of response (S304). If access is denied, the CIFS server (143) sends an error to the CIFS client (111) by way of response (S305).

The CIFS file services end at that point.

Figure 4:
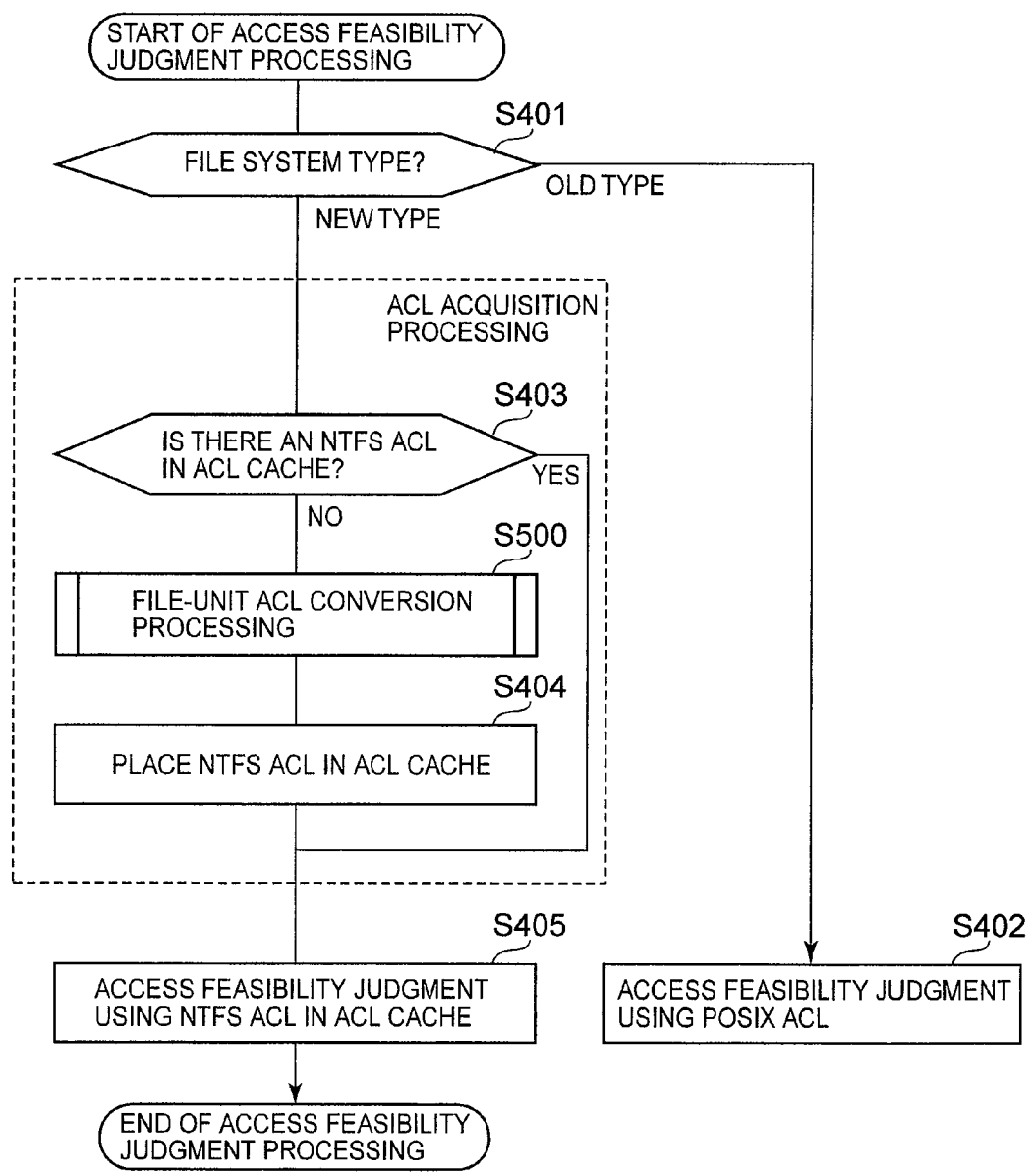
FIG. 4 is a flowchart for access feasibility judgment processing which is S400 of FIG. 3.

FIG. 4 is a flowchart for access feasibility judgment processing which is S400 of FIG. 3.

The access control module (124) judges the type of the current file system by calling the file system information management module (122) and referencing the file system information (128) (S401).

In S401, in cases where the old type (file system that uses POSIX ACL) is judged, the access control module (124) uses the existing POSIX ACL in the file to judge the feasibility of access to the file designated by the file access request (S402).

However, in cases where the new type (file system that uses NTFS ACL) is judged in S401, the access control module (124) executes ACL acquisition processing by calling the ACL cache management module (125).

The ACL cache management module (125) judges whether an NTFS ACL exists on the ACL cache (127) (S403).

If it is judged in S403 that an NTFS ACL exists in the ACL cache (127), the access control module (124) uses the NTFS ACL to judge the feasibility of access to the file that was designated by the file access request (S405).

If it is judged in S403 that there is no NTFS ACL in the ACL cache (127), the access control module (124) executes file-unit ACL conversion processing (S500) (the ACL conversion processing (S500) is the same as the processing called in FIG. 2C and will be described in detail in FIG. 5 which follows). Thereafter, the ACL cache management module (125) writes the converted NTFS ACL (or the NTFS ACL that is already converted and stored in the storage device (131)) to the ACL cache (127) (S404).

The ACL acquisition processing ends as a result of the above steps. In S405 which follows, an access feasibility judgment that uses the NTFS ACL thus written is performed.

The access feasibility judgment processing (S400) ends as a result of the above steps.

The file-unit ACL conversion processing (S500) will be described next with reference to FIG. 5.

First, the ACL conversion module (126) locks the file (the 'target file' in the description of FIG. 5 hereinbelow) (S501).

The ACL conversion module (126) then judges whether the file-unit ACL conversion processing has been called with an overwrite conversion flag (S502). A case where the file-unit ACL conversion processing is called with an overwrite conversion flag is a case where the backup and restore agent (142) receives a restore instruction, as will be described subsequently. In this case, the processing of S503 is skipped and the processing moves on to the processing of S504.

In a normal case where the file-unit ACL conversion processing is not called with an overwrite conversion flag, the ACL conversion module (126) judges whether an NTFS ACL is associated with the target file in the storage device (131) (S503) If it is judged that an NTFS ACL is associated with the target file, the ACL conversion module (126) removes the lock on the target file (S507) and terminates the file-unit ACL conversion processing. If it is judged that an NTFS ACL is not associated with the target file, the ACL conversion module (126) advances to the processing of S504. In S503, it may be judged whether there is an NTFS ACL by searching the storage device for an NTFS ACL or it may be judged whether a flag indicating the presence of an NTFS ACL exists in the file metadata of the target file.

If it is judged in S503 that an NTFS ACL is not associated with the target file, the access control module (124) reads the POSIX ACL associated with the target file from the storage device (131) (S504).

Thereafter, the ACL conversion module (126) converts the read POSIX ACL into an NTFS ACL (S505).

The ACL conversion module (126) then judges whether it is necessary to write the NTFS ACL to the storage device (131) (S600). The details of the writing necessity judgment processing will be described subsequently.

In cases where it is judged that writing is required in the writing necessity judgment processing, the ACL conversion module (126) writes the NTFS ACL that was converted in S505 to the storage device (131) (S506). More specifically, the ACL conversion module (126) associates the converted NTFS ACL with the target file in the storage device (131). The ACL conversion module (126) then advances to the processing of S507.

In cases where it is judged in the writing necessity judgment processing that writing is not required, the ACL conversion module (126) advances to the processing of S507.

In S507, the ACL conversion module (126) removes the lock on the target file (S507).

The file-unit ACL conversion processing ends as a result of the above processing. The file-unit ACL conversion processing may include processing to write the NTFS ACL converted in S505 to the ACL cache (127). Further, the file-unit ACL conversion processing that is performed in response to the file access request from the client (111) or (113) and the background file-unit ACL conversion processing are executed in parallel and, therefore, there is the possibility that a plurality of ACL conversion requests will be generated substantially at the same time for the same file (or directory). However, in this embodiment, from the point where the target file is locked until the target file is unlocked, only one process is permitted to access the POSIX ACL which corresponds with the target file and, therefore, the generation of a conflict with the POSIX ACL can be prevented.

Figure 6:
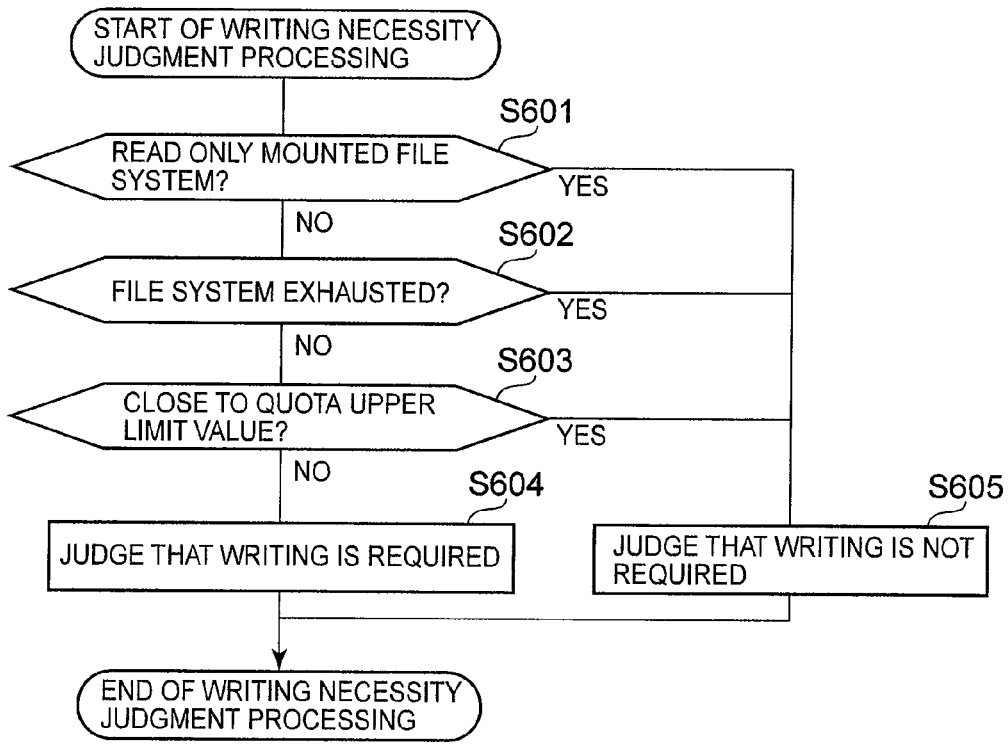
FIG. 6 is a flowchart for the write necessity judgment processing of the first embodiment.

The details of the writing necessity judgment processing (S600) will be described next with reference to FIG. 6.

In S601, the ACL conversion module (126) references the file system information (128) and judges whether the file system managing the target file (the 'target file system' hereinbelow) is mounted as a read only file system. In cases where the file system has been mounted as a read only file system, the ACL conversion module (126) judges that writing is not required (S605) and ends the processing. If the file system has not been mounted as a read only file system, the ACL conversion module (126) advances to S602. A read only mount means that an access attribute which indicates read only (reading is possible but writing is impossible) is associated with the target file system.

In S602, the ACL conversion module (126) judges whether the target file system has been exhausted (more specifically, for example, whether the spare capacity of the logical storage space containing all the files being managed by the target file system is not zero but substantially exhausted at a predetermined amount or whether the spare capacity is zero and therefore completely exhausted (the file system is full)). If it is judged that the spare capacity has been completely exhausted, the ACL conversion module (126) judges that writing is not required (S605) and terminates the processing. If it is judged that the spare capacity has not been exhausted, the ACL conversion module (126) advances to S603.

In S603, the ACL conversion module (126) judges whether the difference between the utilization of the logical storage space managed by the target file system and the upper limit value of the target file quota is a predetermined value, for example, whether the utilization is close to the upper limit value of the target file quota (or has reached the upper limit value). If it is judged that the utilization is close to (or has reached) the quota upper limit value, the ACL conversion module (126) judges that writing is impossible (S605) and terminates the processing. If this judgment is not made, the ACL conversion module (126) judges that writing is required (S604) and terminates the processing.

Figure 5:
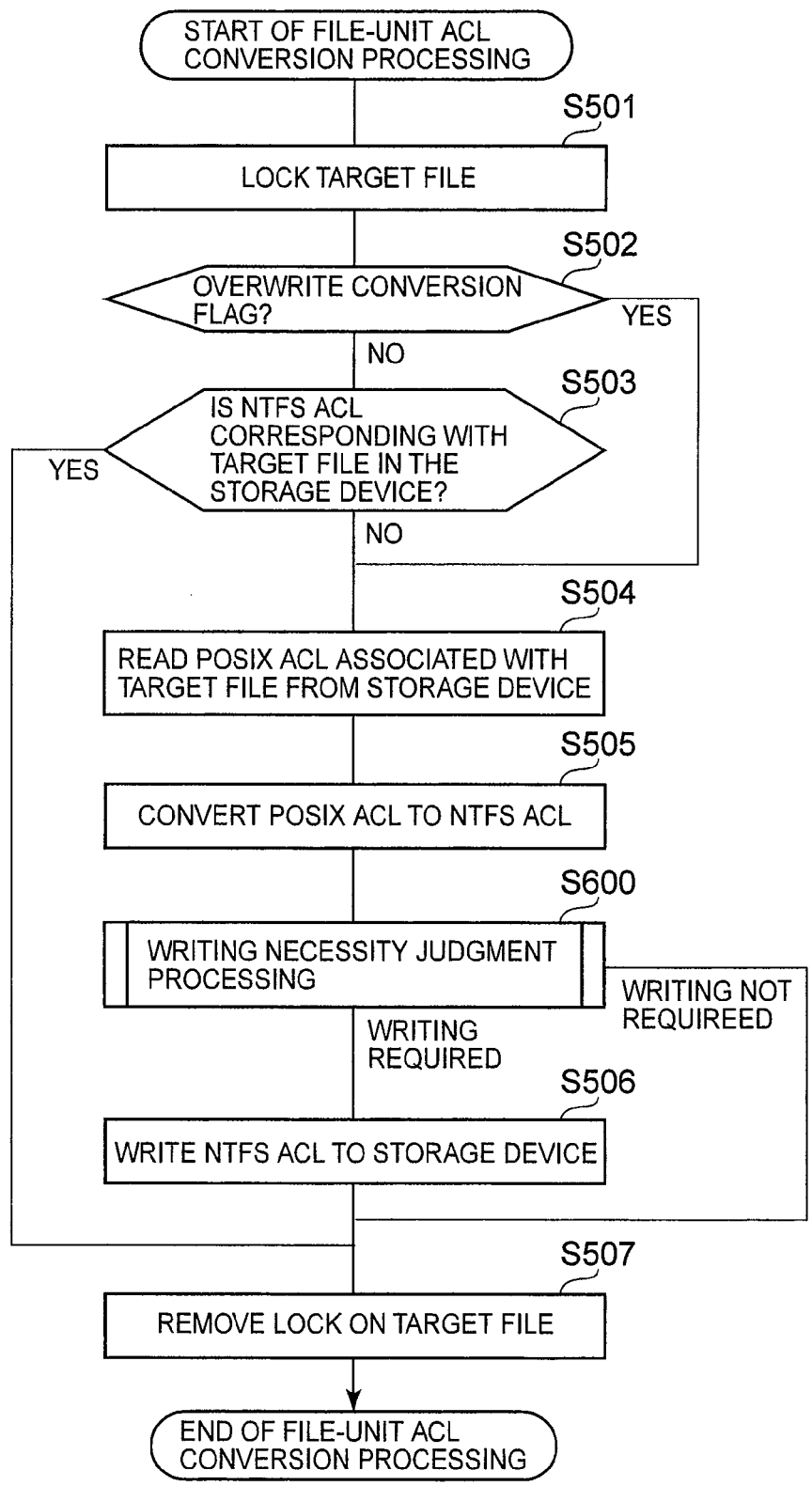
FIG. 5 is a flowchart for ACL conversion processing in file units.

In this embodiment, as shown in FIG. 5, although the writing necessity judgment processing (S600) is carried out prior to actually writing the NTFS ACL (S506), the writing necessity judgment processing (S600) can be implemented so that specified errors are ignored when writing has been performed with respect to the storage device (131). For example, writing errors such as read only file system errors (EROFS), file system full errors (ENOSPC), and quota errors (EDQUOT) may be ignored.

According to the description hereinabove, even when a file access request designating a file with which an NTFS ACL has not been associated is received from the client (111) or (113), the POSIX ACL associated with the file can be converted into an NTFS ACL in response to the request and access control can be carried out by using the NTFS ACL. In addition, an NTFS ACL can be prepared by means of background ACL conversion processing with respect to a file that has not been accessed by the client (111) or (113).

Figure 10:
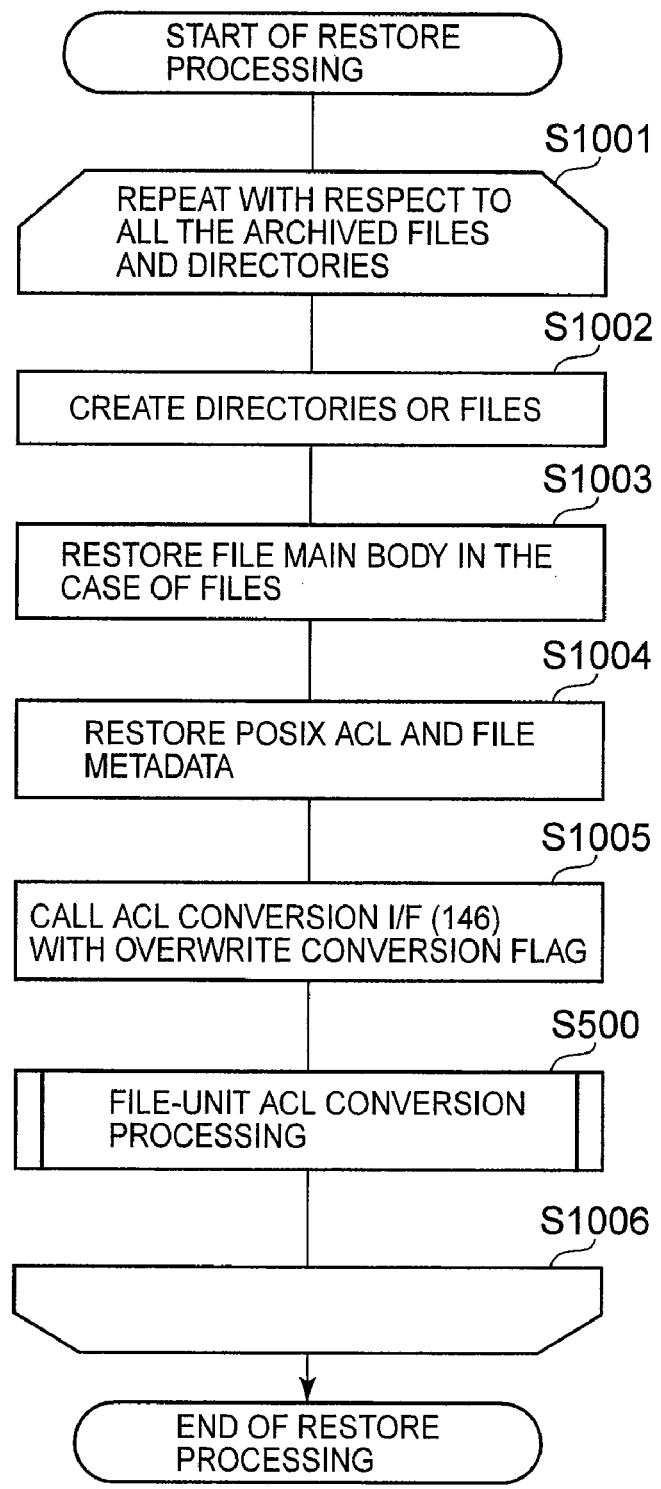
FIG. 10 shows a flowchart for restore processing.

FIG. 10 shows a flowchart for restore processing.

In cases where the backup restore agent (142) receives a restore instruction designating an archive image (backup image) from the backup and restore server (112), the processing of steps S1002 to S500 is repeated with respect to all the files and all the directories of the archive image.

In other words, the backup and restore agent (142) calls the file access module (123) via the file access I/F (147) and the access control module (124) creates the directories or files of the restore target in the storage device 131, for example (S1002). In the case of the files, the access control module (124) restores the file main body to the file created in S1002 (S1003). Further, the access control module (124) also restores the associated POSIX ACL and file metadata with the file created in S1002 (S1004).

Thereafter, the backup restore agent (142) calls the ACL conversion I/F (145) with the overwrite conversion flag (S1005).

The ACL conversion module (126) executes the file unit ACL conversion processing (S500). Here, as mentioned earlier, because the file unit ACL conversion processing is called with the overwrite conversion flag, S502 in FIG. 5 yields a YES and S503 is not executed, and the processing of S504 is executed. Here, because the POSIX ACL is acquired from the archive image, in cases where S502 yields a YES, S504 may be skipped and S505 may be carried out. Further, the conversion to NTFS ACL is executed on the basis of the POSIX ACL acquired from the archive image. This is so that an NTFS ACL which corresponds with the POSIX ACL when the backup was acquired is generated. Because S503 is not performed, an overwrite file exists as a result of the restore in the storage device (131) and, even when an NTFS ACL is already associated with the file, an NTFS ACL that is generated on the basis of the POSIX ACL when the backup was made is associated with the restored file rather than the existing NTFS ACL.

As a result of the above restore processing, a backup image that comprises files which are managed by the old-type file system (the file system corresponding with the POSIX ACL) can be restored as an image that comprises the files managed by the new-type file system (the file system corresponding with the NTFS ACL).

Second Embodiment

The second embodiment of the present invention will be described hereinbelow. Here, the differences from the first embodiment will be mainly described and a description of the points in common with the first embodiment will be omitted or simplified (the same is also true of the subsequent third to fifth embodiments).

In the writing necessity judgment processing of the first embodiment, in cases where the file system is a read only mount file system, the converted NTFS ACL is not written to the storage device (131) but can instead be processed as follows.

Figure 7:
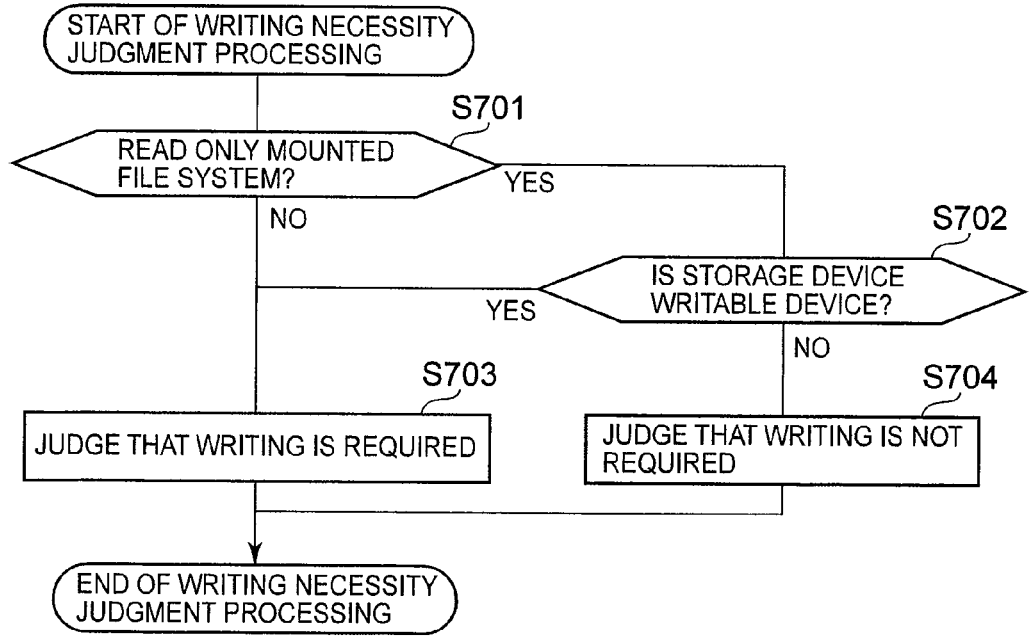
FIG. 7 is a flowchart for write necessity judgment processing of a second embodiment of the present invention.

FIG. 7 is a flowchart for write necessity judgment processing of a second embodiment of the present invention.

The ACL conversion module (126) references the file system information (128) and judges whether the target file system has been mounted as a read only file system (S701). In cases where the target file system has been mounted as a read only file system, the ACL conversion module (126) then judges whether the storage device (131) is a writable device (S702). Here, writable devices include rewritable devices such as hard disks or flash memory, for example. However, unwritable devices include write-once devices such as CD-ROM, for example.

In cases where the file system has not been mounted as a read only file system and cases where the file system has been mounted as a read only file system but the storage device (131) is a writable device, the ACL conversion module (126) judges that writing is required (S703) and terminates the processing. However, in cases where the file system has been mounted as a read only file system but the storage device (131) is an unwritable device, the ACL conversion module (126) judges that writing is impossible (S704) and terminates the processing. Even when the file system has been mounted as a read only file system and the storage device (131) is a writable device, it many be judged that writing is not required due to other factors such as a file system full event.

The fact that the file system has been mounted as a read only file system means that the file system is logically unwritable but does not mean that the file system is physically unwritable. In this embodiment, if the file system has been mounted as a read only file system and the storage device (131) is a writable device, the converted NTFS ACL is written by the storage device (131). If the file system has been mounted as a read only file system, the writing of a file designated by a file access request can be prohibited by the access control module (124). That is, the writing of the file main body is prohibited in accordance with a read only mounted file system while the fact that the file system has been mounted as a read only file system can be ignored for the NTFS ACL which can be written to the storage device (131).

Third Embodiment

Figure 8:
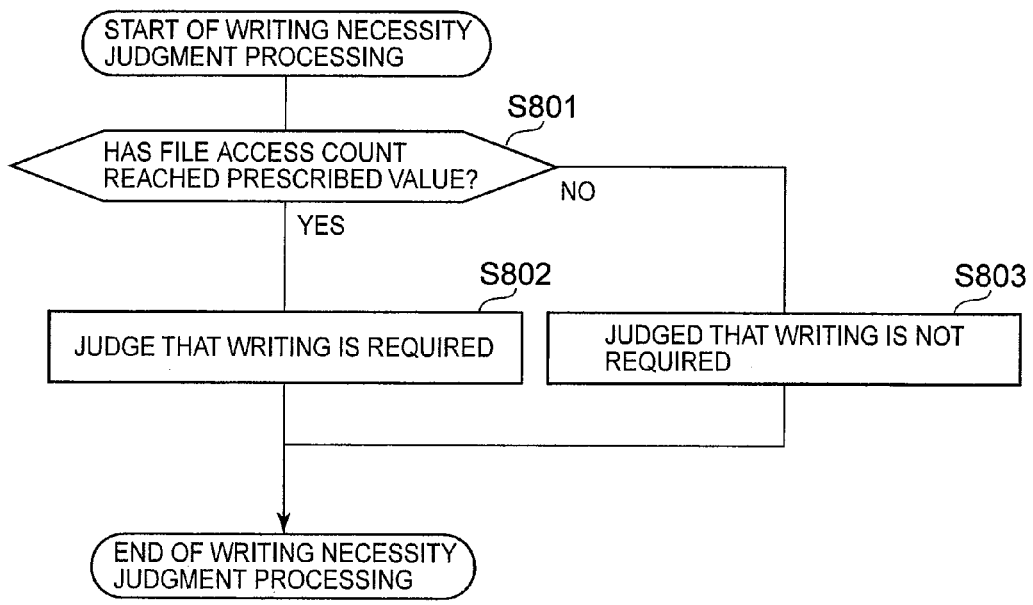
FIG. 8 is a flowchart for write necessity judgment processing of a third embodiment of the present invention.

FIG. 8 is a flowchart for write necessity judgment processing of the third embodiment of the present invention.

The ACL conversion module (126) is information references file access statistical information (information representing statistics such as the file access count which is information that is updated each time a file is accessed, for example) and judges whether the file access count has reached a prescribed count (ten times, for example) (S801).

In cases where the access count is less than the prescribed count, the ACL conversion module (126) judges that writing is not required (S803) and terminates the processing. However, in cases where the access count is equal to or more than the prescribed count, the ACL conversion module (126) judges that writing is required (S802) and terminates the processing.

Thus, where files for which access has only occurred a few times, compression of the spare capacity can be prevented due to the fact that the converted NTFS ACL is not written to the storage device (131). Further, in cases where the storage device (131) is constituted by a device with a low write speed and/or for which there are restrictions on the number of possible writes as is the case of flash memory or the like, this third embodiment is useful.

The writing necessity judgment processes that were described in the first to third embodiments can also be used in combination. For example, in the writing necessity judgment processing of the third embodiment, a check of the quota upper limit value of the writing necessity judgment processing of the first embodiment may also be carried out.

Fourth Embodiment

According to the fourth embodiment of the present invention, in the write necessity judgment processing, the NTFS ACL of the dirty for which the factor causing the write fault has been eliminated among the NTFS ACL for which writing is judged to be unnecessary (called 'dirty NTFS ACL' hereinbelow) are written to the storage device (131). In the fourth embodiment, first and second cache flush daemon processing is carried out.

Figure 9A:
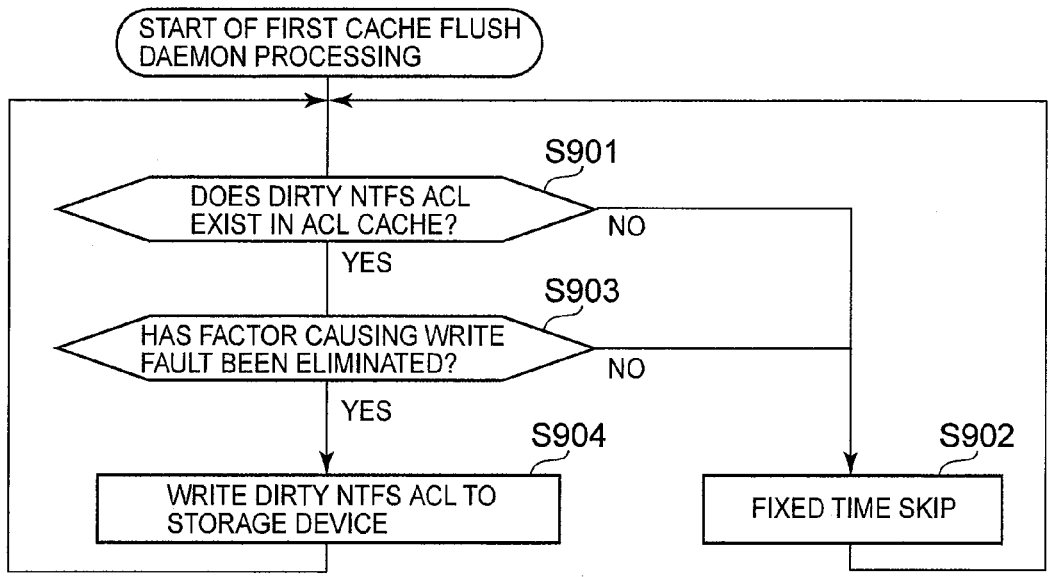
FIG. 9A is a flowchart for first cache flush daemon processing according to a fourth embodiment of the present invention.

FIG. 9A is a flowchart for first cache flush daemon processing.

The ACL cache management module (125) judges whether a dirty NTFS ACL exists in the ACL cache (127) (S901). When it is judged that a dirty NTFS ACL does not exist, the ACL cache management module (125) skips a fixed time ahead (five minutes, for example) (S902) and performs S901 once again.

In cases where it is judged that a dirty NTFS ACL exists, the ACL cache management module (125) judges whether the factor causing the write fault has been eliminated (S903). Here, 'factor causing the write fault' is a factor causing a fault in the writing of an NTFS ACL to the storage device (131) and, more specifically, for example, signifies the exhaustion of the capacity of the logical storage space managed by the file system (file system full, for example) or the fact that the utilization of the logical storage space that is managed by the file system is close to or has reached the quota upper limit value.

If it is judged that the factor causing the write fault has been eliminated, the ACL cache management module (125) writes the dirty NTFS ACL in the ACL cache (127) to the storage device (131) (S904) and returns the processing to S901.

If it is judged that the factor causing the write fault has not been eliminated, the ACL cache management module (125) does not write the dirty NTFS ACL in the ACL cache (127) to the storage device (131) and moves the processing to S902 and returns to S901.

The above first cache flush daemon processing is carried out using the so-called poling method. That is, it is checked at regular intervals whether the cause of the write fault has been eliminated and, in cases where the cause of the write fault has been eliminated, the dirty NTFS ACL is written to the storage device (131).

In contrast, the second cache flush daemon processing is processing of a so-called event-driven system. In the fourth embodiment, one or both of the first and second cache flush daemon processes can be adopted.

Figure 9B:
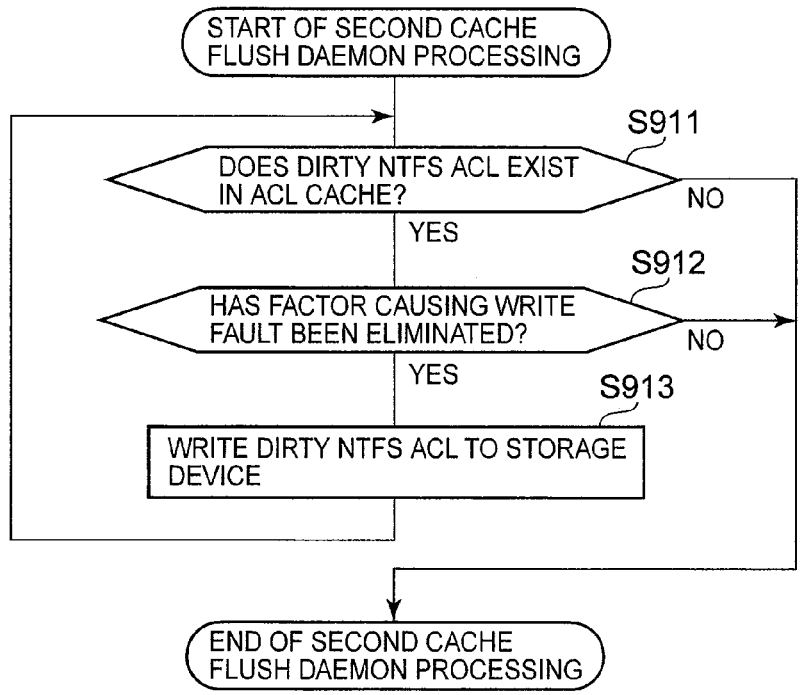
FIG. 9B is a flowchart for second cache flush daemon processing of the fourth embodiment.

FIG. 9B is a flowchart for the second cache flush daemon processing.

Given a specified event such as an event where 'an object (a file or an ACL in the file, for example) has been deleted from the logical storage space managed by the target file system', for example, second cache flush daemon processing is started.

As per S901, the ACL cache management module (125) judges whether a dirty NTFS ACL exists in the ACL cache (127) (S911), and terminates the processing if it is judged that a dirty NTFS ACL does not exist therein.

However, if it is judged that a dirty NTFS ACL exists in the ACL cache (127), the ACL cache management module (125) judges whether the factor causing the write fault has been eliminated as per S903 (S912). If it is judged that the factor causing the write fault has not been eliminated, the ACL cache management module (125) terminates the processing.

According to the judgment that the factor causing the fault has been eliminated, the ACL cache management module (125) writes the dirty NTFS ACL to the storage device (131) as per S904 (S913). The processing then returns to S911.

The processing that is described with reference to FIG. 9A and/or FIG. 9B may be performed in at least one of the first to third embodiments.

Fifth Embodiment

Figure 12:
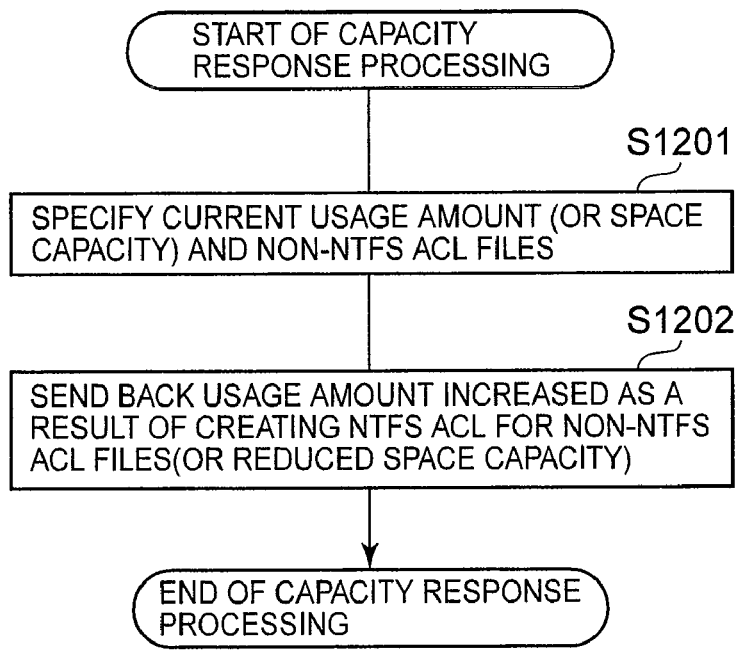
FIG. 12 is a flowchart for capacity response processing according to a fifth embodiment of the present invention.

FIG. 12 is a flowchart for the capacity response processing that is executed in the fifth embodiment of the present invention.

Capacity response processing is processing that is executed in cases where an inquiry regarding the usage amount or spare capacity of the logical storage space managed by the file system is received from the NAS manager (101) or client (111) or (113) and processing to respond to the inquiry by sending back the usage amount or spare capacity. For example, the access control module (124) specifies, based on the file system, the current usage amount (or spare capacity) of the logical storage space designated by the inquiry and specifies a file without NTFS ACL ('non-NTFS file' hereinbelow) (S1201). Further, the access control module (124) sends back a value obtained by adding the total of one or more NTFS ACL which correspond with one or more non-NTFS ACL files to the current usage amount (or a value obtained by subtracting the total of one or more NTFS ACL which correspond with one or more non-NTFS ACL files from the current spare capacity) to the source of the inquiry (S1202). As a result, it can be expected that the exhaustion of the logical storage space when the NTFS ACL are actually created and written to the logical storage space will be prevented.

The processing described with reference to FIG. 12 can also be performed in at least one of the first to fourth embodiments.

Sixth Embodiment

Figure 13:
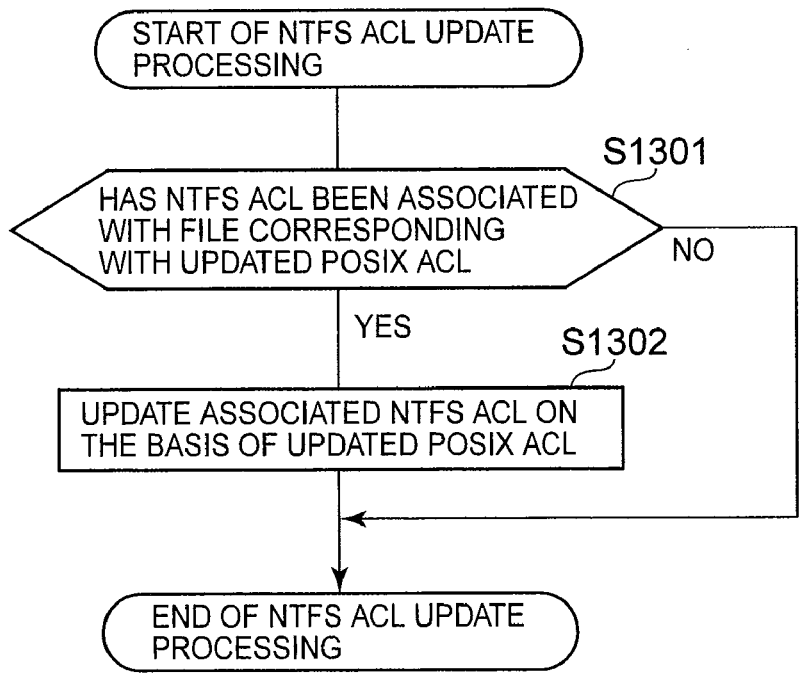
FIG. 13 is a flowchart for NTFS ACL update processing that is performed according to a sixth embodiment of the present invention.

FIG. 13 is a flowchart for the update processing of the NTFS ACL that is performed in the sixth embodiment of the present invention.

The ACL conversion module (126) starts this processing in the event that the POSIX ACL is updated. If the NTFS ACL is associated with the file with which the updated POSIX ACL is associated (YES in S1301), the ACL conversion module (126) updates the NTFS ACL on the basis of the updated POSIX ACL (S1302). As a result, the integrity of the POSIX ACL and NTFS ACL can be preserved.

Conversely, in cases where the NTFS ACL is updated, the corresponding POSIX ACL may also be updated. The processing shown in FIG. 13 can be performed in at least one of the first to sixth embodiments.

Embodiments of the present invention were described hereinabove but are examples which serve to illustrate the present invention, there being no intention to limit the scope of the present invention to these embodiments alone. The present invention can also be implemented using a variety of other forms. For example, all or some of the logical storage space managed by the file system may also be integrated as some of the GNS (Global Name Space). In addition, this processing may also be performed once again in cases where the generation of the NTFS ACL fails in S505 of FIG. 5 or file-unit ACL conversion processing may be terminated without performing this processing again (in the latter case, the NTFS ACL is generated when access takes place the next time and on subsequent occasions). Furthermore, with regard to background ACL conversion processing, for example, in cases where this processing ends abnormally when the NTFS ACL conversion fails for example, in the subsequent background ACL conversion processing, all the files may be scanned irrespective of whether scanning is complete or only the files that failed to undergo the ACL conversion in the previous ACL conversion processing and the unscanned files may be scanned.

What is claimed is:

1. An access controller that receives a file access request and uses an access control list (ACL) to control access with respect to a file designated by the file access request, comprising:
a processor; and
a memory,
wherein in response to receiving the file access request, the processor determines whether the file designated by the file access request is associated with a first type of ACL, the first type of ACL corresponding to a first type of file system, wherein when the file designated by the file access request is associated with the first type of ACL, the processor determines whether the first type of ACL is stored in the memory, and when the first type of ACL is stored in the memory, the processor controls access to the file designated by the file access request by using the first type of ACL,
wherein when the file designated by the file access request is not associated with the first type of ACL, and when the first type of ACL is not stored in the memory, the processor locks the file designated by the file access request, converts a second type of ACL to the first type of ACL, the second type of ACL corresponding to a second type of file system which is associated with the file designated by the file access request, and after conversion of the second type of ACL to the first type of ACL, the processor unlocks the file designated by the file access request,
wherein in response to receiving an ACL conversion request to convert the second type of ACL to the first type of ACL for each of a plurality of files, the processor determines whether each of the plurality of files is associated with the first type of ACL, which corresponds to the first type of file system,
wherein when each of the plurality of files is not associated with the first type of ACL, the processor converts the second type of ACL to the first type of ACL, and controls access to the file designated by the file access request by using the first type of ACL thus converted, and
wherein execution of conversion of the file designated by the file access request occurs in parallel with conversion of the plurality of files, the plurality of files not including the file designated by the file access request.

2. The access controller according to claim 1,
wherein the processor writes the generated first type of ACL on a storage device coupled to the access controller, except when a target file system, which is a file system of the file designated by the file access request, is not mounted as a read only, the target file system has not been exhausted, a utilization of a logical storage space managed by the target file system is less than a predetermined upper limit value, and a file access count of the file designated by the file access request has reached a predetermined count.

3. The access controller according to claim 2,
wherein the processor prevents generating the first type of ACL based on a second type of ACL by the ACL converting request, when the file receives the file access request, and
wherein the processor prevents generating the first type of ACL based on a second type of ACL by the file access request, when the file receives the ACL converting request.

4. The access controller according to claim 2,
wherein the processor receives a switching instruction to switch the type of the file system or the type of the ACL to be used from the second type to the first type,
wherein the processor switches the type of the file system or the type of the ACL from the second type to the first type in response to the switching instruction, and
wherein the processor generates the first type of ACL based on the second type of ACL, which corresponds to the file designated by the file access request, when the result of the determination performed in response to receiving the file access request is negative after the type of the file system or the type of the ACL to be used is switched from the second type to the first type.

5. The access controller according to claim 4, further comprising:
a storage resource that stores type information indicating the type of the file system or the type of the ACL to be used,
wherein the processor is programmed to specify the type of the current file system or ACL by referencing the type information, and
wherein the processor completes the switching of the type of the file system or the type of the ACL to be used from the second type to the first type by updating the type information from information indicating the second type to information indicating the first type.

6. The access controller according to claim 2, wherein the processor determines whether the generated first type of ACL can be written to a logical storage space, which comprises files managed by the file system,
wherein if determined that writing is possible, the processor writes the first type of ACL corresponding with the files to both the logical storage space and the memory, wherein if determined that writing is impossible, the ACL generation module does not write the first type of ACL corresponding to the files to the logical storage space, but writes the first type of ACL to the memory, and wherein the processor makes a determination as to whether the first type of ACL is associated with a file designated by the received file access request by referencing the memory, and when the first type of ACL which corresponds with the file is stored in the memory, the result of the determination is affirmative.

7. The access controller according to claim 6, wherein, in any of the following cases (1) to (3), the processor determines that the generated first type of ACL cannot be written to the logical storage space:
   (1) when a spare capacity of a magnitude permitting storage of the generated first type of ACL does not exist in the logical storage space;
   (2) when the difference between the used capacity or spare capacity of the logical storage space and a preset control value is a predetermined value; and
   (3) when an access attribute signifying that reading is possible but writing is impossible is associated with the logical storage space.

8. The access controller according to claim 6,
   wherein the processor monitors whether the first type of ACL can be written to the logical storage space, and
   wherein when detected that writing is possible, the processor writes the first type of ACL that has not yet been written to the logical storage device and that is stored in the memory to the logical storage space.

9. The access controller according to claim 2, wherein, even when an access attribute signifying that reading is possible but writing is impossible is associated with the logical storage space that comprises files managed by the file system, the processor writes the first type of ACL, which is associated with the designated file, to the logical storage space.

10. The access controller according to claim 6,
    wherein the processor receives an inquiry regarding the used capacity or spare capacity of the logical storage space managed by the file system, and
    wherein the processor sends back the used capacity or spare capacity when an assumption is made that the first type of ACL is associated with all of the files in the logical storage space.

11. The access controller according to claim 6,
    wherein the processor writes the generated first type of ACL to the memory and writes, when the first type of ACL stored in the memory is used by the processor a prescribed number of times or more, the first type of ACL stored in the memory to the logical storage space which comprises files managed by the file system.

12. The access controller according to claim 6,
    wherein the processor receives a switching instruction to switch the type of the file system or the type of the ACL to be used from the second type to the first type,
    wherein the access controller further comprises:
    a storage resource that stores type information indicating the type of the file system or the type of the ACL to be used,
    wherein the processor completes the switching of the type of the file system or the type of the ACL to be used from the second type to the first type by updating the type information from information indicating the second type to information indicating the first type in response to the switching instruction,
    wherein the processor is programmed to specify the type of the file system or the type of the ACL to be used by referencing the type information and determines whether the first type of ACL is associated with all the files that exist in the logical storage space which comprises files managed by the file system while receiving a file access request, and when files are restored, does not determine whether the first type of ACL is associated with the files prior to the update by means of the restored files,
    wherein after the type of the file system or the type of the ACL to be used is switched from the second type to the first type, the processor generates, when the result of the determines is a negative determination result, the first type of ACL based on the second type of ACL which corresponds with the files corresponding with the negative judgment result, and when files are restored, the processor generates the first type of ACL which is associated with the updated files constituting restored files based on the restored second type of ACL which corresponds with the updated files even when the first type of ACL is associated with the files before being updated and determines whether the generated first type of ACL can be written to the logical storage space,
    wherein if it is determined that writing is possible, the processor writes the first type of ACL thus generated to both the logical storage space and the memory, and if it is determined that writing is impossible, the processor does not write the first type of ACL thus generated to the logical storage space and instead writes the first type of ACL to the memory, and
    wherein the processor performs the determination as to whether the first type of ACL is associated with the file designated by the file access request received, by referencing the memory, and if the first type of ACL corresponding with the file is stored in the memory, the result of the determination is affirmative.

13. The access controller according to claim 2, wherein when the second type of ACL corresponding to the file with which the first type of ACL is associated is updated, the ACL generation module updates the first type of ACL based on the updated second type of ACL.

14. The access controller according to claim 2, wherein when a file with which the first type of ACL is associated is updated to a restored file as a result of a backed up file and the corresponding second type of ACL being restored, the processor associates a first type of ACL, which is generated based on the restored second type of ACL and corresponds to the updated file, with the updated file constituting the restored file rather than the first type of ACL which corresponds with the pre-update file.

15. A storage system, comprising:
    a storage device in which data constituting files managed by a file system are stored; and
    an access controller that receives a file access request and uses an access control list (ACL) to control access to a file designated by the file access request,
    wherein the access controller comprises a memory, an ACL judgment module, an ACL generation module, and an access control module,
    wherein the ACL judgment module determines whether a first type of ACL, which corresponds to a first type of file system, is associated with the file designated by the file access request, in response to receiving the file access request;
    wherein when the file designated by the file access request is associated with the first type of ACL, the ACL judgment module determines whether the first type of ACL is stored in the memory, and when the first type of ACL is stored in the memory, access control module controls access to the file designated by the file access request by using the first type of ACL, wherein when a result of the determination is a negative determination result, and when the first type of ACL is not stored in the memory, the ACL generation module locks the file designated by the file access request, converts a second type of ACL to the first type of ACL, the second type of ACL corresponding to a second type of file system, which is already associated with the designated file, and after conversion of the second type of ACL to the first type of ACL, the processor unlocks the file designated by the file access request, wherein, while accepting the file access request, and in response to receiving an ACL conversion request to convert the second type of ACL to the first type of ACL for each of a plurality of files, the ACL judgment module determines whether each of the plurality of files are associated with the first type of ACL, which corresponds to the first type of file system, and wherein when each of the plurality of files is not associated with the first type of ACL, the ACL generation module generates the second type of ACL to the first type of ACL; and an access control module that controls access to the file designated by the file access request by using the first type of ACL thus converted, wherein execution of conversion of the file designated by the file access request occurs in parallel with conversion of the plurality of files, the plurality of files not including the file designated by the file access request.

16. The storage system according to claim 15, wherein the ACL generation module determines whether the generated first type of ACL can be written to the logical storage space that comprises files managed by the file system, and if it is determined that writing is possible, writes the first type ACL, which corresponds to the file, to both the storage device on which the logical storage space is based and the memory, and if it is determined that writing is impossible, does not write the first type of ACL that is associated with the file to the storage device and writes the first type of ACL to the memory, and wherein the ACL judgment module performs the determination of whether the first type of ACL is associated with the file designated by the file access request received, by referencing the memory, and if the first type of ACL corresponding to the file is stored in the memory, the result of the determination is affirmative.

17. A method for an access control in a storage system which comprises a processor and a memory, and manages a file access by the type of an access control list (ACL), the method comprising the steps, executed by the processor, of:

switching the type of a file system or the type of ACL to be used from a second type to a first type;

receiving a file access request;

performing a first determination as to whether the first type of ACL that corresponds to the first type of file system is associated with a file that is designated by the file access request;

when the result of the first determination indicates that the file designated by the file access request is associated with the first type of ACL, performing a second determination as to whether the first type of ACL is stored in the memory;

when the file designated by the file access request is not associated with the first type of ACL, and when the first type of ACL is not stored in the memory, locking the file designated by the file access request, converting a second type of ACL to the first type of ACL, the second type of ACL corresponding to a second type of file system which is associated with the file designated by the file access request, and after converting the second type of ACL to the first type of ACL, unlocking the file designated by the file access request;

in response to receiving an ACL conversion request to convert the second type of ACL to the first type of ACL for each of a plurality of files, determining whether each of the plurality of files is associated with the first type of ACL, which corresponds to the first type of file system;

when each of the plurality of files is not associated with the first type of ACL, converting the second type of ACL to the first type of ACL, and controlling access to the file designated by the file access request by using the first type of ACL thus converted; and executing conversion of the file designated by the file access request in parallel with conversion of the plurality of files, the plurality of files not including the file designated by the file access request.

* * * * *